United States Patent [19]

Cohen

[11] 4,376,937

[45] Mar. 15, 1983

[54] ANTENNA FOR PRIMARY AND SECONDARY RADARS

[75] Inventor: Georges Cohen, Paris, France

[73] Assignee: Thomson-CSF, Paris, France

[21] Appl. No.: 183,066

[22] Filed: Sep. 2, 1980

[30] Foreign Application Priority Data

Sep. 7, 1979 [FR] France ........ 79 22450

[51] Int. Cl.³ ........ G01S 13/44; H01Q 21/29

[52] U.S. Cl. ........ 343/16 M; 343/727

[58] Field of Search ........ 343/16 M, 727

[56] References Cited

U.S. PATENT DOCUMENTS

| | | | |
|---|---|---|---|
| 3,032,759 | 5/1962 | Ashby | 343/16 M |
| 3,122,737 | 2/1964 | Setrin | 343/6.5 R |
| 3,296,615 | 1/1967 | Page et al. | 343/6.5 R |
| 3,311,912 | 3/1967 | Page | 343/6.5 R X |
| 3,312,970 | 4/1967 | Bond | 343/6.5 R X |
| 3,618,091 | 11/1971 | Butler | 343/16 M |
| 3,688,313 | 8/1972 | Kern | 343/7 A X |
| 3,893,116 | 7/1975 | Hudspeth et al. | 343/16 M |
| 3,916,414 | 10/1975 | Trigon et al. | |

*Primary Examiner*—Malcolm F. Hubler
*Attorney, Agent, or Firm*—Karl F. Ross

[57] ABSTRACT

A common antenna system for a primary and a secondary radar transceiver, designed for monitoring air traffic, has a primary feeder or source connected to a primary-radar transceiver and terminating in a horn confronting a reflector, this source including two transverse probes connected to a secondary-radar transceiver which also communicates with a pair of ancillary feeders flanking the horn in an azimuthal plane. The horn is also flanked by two dipoles, closer than the ancillary feeders, delivering a difference signal of a monopulse channel to an angular-deviation-measuring receiver to which an incoming sum signal of the same channel is fed from the probes by way of the secondary-radar transceiver. The signals of the monopulse channel are emitted by transponders aboard an aircraft in response to interrogation signals sent out and received back by the probes in a radiation pattern blanked for the most part by control signals transmitted and received by the ancillary feeders, these control signals leaving free an interrogation arc of limited azimuthal extent; the signals of the monopulse channel define a narrower angular-deviation-measuring arc for localizing an aircraft within the interrogation arc.

5 Claims, 4 Drawing Figures

ANTENNA FOR PRIMARY AND SECONDARY RADARS

FIELD OF THE INVENTION

My present invention relates to an aerial for primary and secondary radars. It also relates to the radar equipment using such an aerial in an air-traffic-monitoring station.

BACKGROUND OF THE INVENTION

In such stations the primary radar has the function of detecting the presence of an aircraft in the sky and providing information thereon, such as its distance, azimuth and/or elevation and optionally speed, according to the antenna type used.

The secondary radar associated with the primary radar in the station makes it possible to obtain identification information on this aircraft and possibly details of its altitude when that object is equipped with a transponder designed for this purpose.

The aerial of such a radar station comprises an antenna for the primary radar and one or two antennas for the secondary radar. Existing secondary radars must be able to transmit and receive two different signals. The first is called the interrogation signal and is transmitted and received by a corresponding antenna, whereas the second is called the control signal and serves to inhibit all interrogations made in directions other than that of the major lobe of the radiation diagram or pattern of the interrogation antenna.

Thus, there is an antenna for transmitting and receiving interrogation signals and this antenna has a radiation diagram with a major lobe and minor lobes. The control signals are transmitted and received either by another antenna or by the same interrogation antenna. The radiation diagram of the control channel can be of omnidirectional or differential type in the azimuthal plane. In all these cases the control diagram covers the interrogation diagram, except for a small area which is centered on the major interrogation lobe and is called the interrogation arc.

An air-traffic-monitoring station incorporating a secondary radar whose aerial is in accordance with what has been stated hereinbefore, i.e. radiating a diagram of the difference type in azimuth, has been disclosed in commonly owned U.S. Pat. No. 3,916,414 and functions in a manner considered to be satisfactory. However, the azimuthal resolution of such a radar, i.e. its capacity to distinguish between two aircraft which are relatively close to one another, is not very fine. This is liable to cause problems to the radar operators in the station in connection with the identification of interrogated aircraft or targets, mainly at close range. This lack of resolution is mainly due to the width of the interrogation arc, which is inherent in the system and difficult to influence.

Therefore this inadequate azimuthal resolution causes problems in connection with the identification of interrogated targets, particularly when the latter are crossing, in parallel paths or on waiting lines.

One presently adopted solution consists in having prohibitive spacing requirements which are prejudicial to the traffic flow, this being rather impractical in view of the fact that radar stations are having to deal with an ever-increasing number of aircraft.

OBJECT OF THE INVENTION

The object of my invention is to obviate this disadvantage and to define means in an otherwise conventional radar system enabling the secondary radar to have an azimuthal resolution greater than that given by the control channel.

SUMMARY OF THE INVENTION

An antenna system embodying my invention, designed for the monitoring of air traffic, comprises a number of components known from the above-identified prior patent, among them a primary-radar transceiver, a secondary-radar transceiver, a primary feeder or source connected to the primary-radar transceiver and terminating in a horn confronting a reflector, and two transverse probes in a cylindrical section of that source connected to the secondary-radar transceiver for sending out and receiving interrogation signals in a radiation pattern which is blanked for the most part by control signals leaving free an interrogation arc of limited azimuthal extent. The control signals are transmitted and received by a pair of ancillary feeders which, facing the reflector, flank the horn in an azimuthal plane and are also connected, through a power divider, to the secondary-radar transceiver.

In accordance with the present improvement I provide a monopulse channel carrying incoming signals from transponders aboard aninterrogated aircraft, this channel including a pair of auxiliary sources flanking the horn and confronting the reflector in a common azimuthal plane with the ancillary feeders. The monopulse channel further comprises angular-deviation-measuring means with inputs connected to the auxiliary sources and to the two probes for respectively receiving therefrom a difference signal and a sum signal of that channel defining a narrower arc for localizing the interrogated aircraft within the aforementioned interrogation arc.

The auxiliary sources preferably are disposed between the ancillary feeders and the horn and, advantageously, are designed as dipoles paralleling and closely adjoining the major sides of the horn whose planes include with the axis of the probes an angle of not more than about 45°.

BRIEF DESCRIPTION OF THE DRAWING

The above and other features of my invention are described in greater detail hereinafter with reference to the attached drawing wherein.

DETAILED DESCRIPTION

As noted above, the improvement of the azimuthal resolution of the secondary radar of a conventional system is obtained pursuant to my present invention by providing in combination therewith a monopulse channel permitting an angular-deviation measurement on the interrogated targets that are not separately discernible by the operator on the indicator associated with the control channel and consequently not identifiable, although they have been interrogated.

Figure 1:
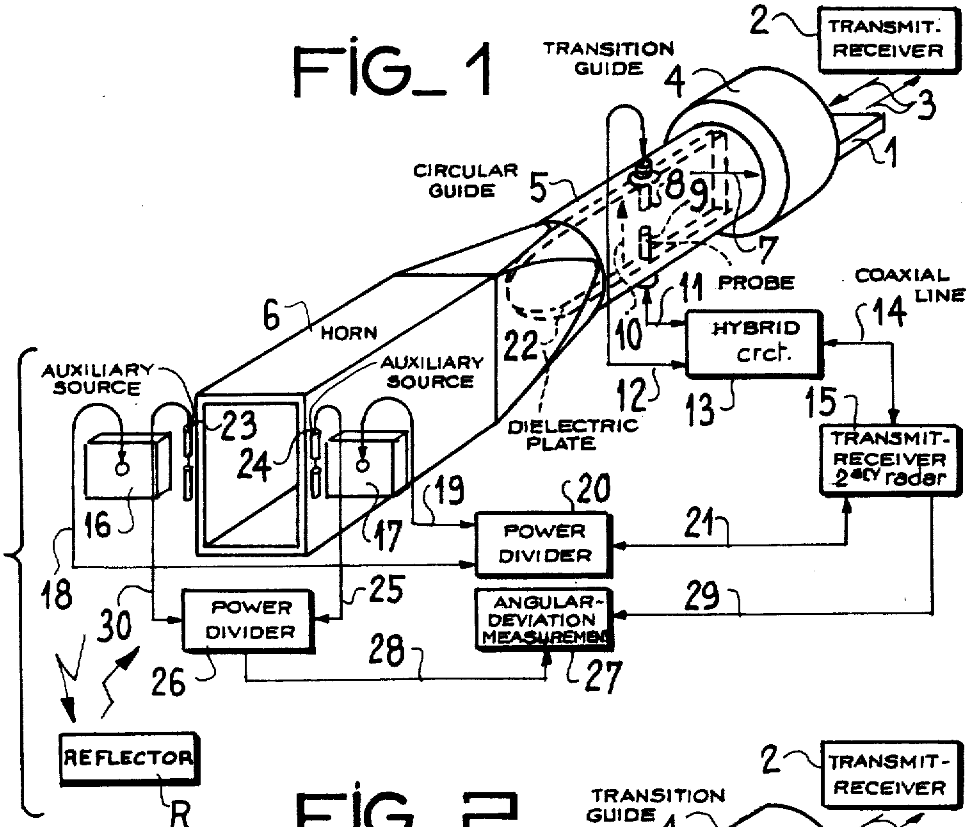
FIG. 1 shows, partly in block form, an embodiment of the primary source of an antenna according to the invention operating with linear polarization.

FIG. 1 illustrates an embodiment of a secondary-radar antenna incorporating the angular-deviation-measurement channel according to the invention.

This antenna is integrated into the primary radar in conformity with the presently preferred solution. In a general manner the antenna comprises a certain number of elements known from the prior U.S. patent referred to above.

A focusing element, i.e. a reflector which is common to the four operating modes of the antenna, namely primary radar, secondary radar, monopulse interrogation and control, has been schematically indicated at R in the drawing. The primary feeder or source of the primary radar, which is modified so as to also transmit the signals relative to the operation of the secondary radar, comprises in series a rectangular guide section 1 connected to the transmitter-receiver 2 of the primary radar, a transition guide 4, a circular guide section 5, and a horn 6. The connection between the primary source and the transceiver 2 is indicated by two arrows 3. In actual fact that connection is constituted by a certain length of waveguide equipped with a rotary joint in order to permit the rotation of the antenna about a vertical axis.

The radar waves, whose polarization vector is indicated by a horizontal arrow 7, on transmission pass through the source from the rectangular guide 1 to horn 6, where they are radiated towards the reflector R. On reception the propagation of the waves takes place in the opposite direction.

The antenna incorporates means permitting it to perform the secondary-radar function. In the present system, as also in the radar described in prior U.S. Pat. No. 3,916,414, there are two probes 8 and 9, based in the circular guide 5 and connected to the transmitter-receiver 15 of the secondary radar for transmitting and receiving the interrogation signals, whose polarization represented by a vertical vector 10 is perpendicular to that of the waves of the primary radar. They are supplied in phase opposition by a hybrid circuit 13, comprising a power divider and a filter. Circuit 13 is connected to the transmitter-receiver 15 by a bidirectional coaxial line 14 and the probes 8 and 9 are connected to circuit 13 by bidirectional coaxial lines 12 and 11, respectively. The filter of the hybrid circuit 13 only transmits interrogation signals and inhibits the signals at the frequency of the primary radar. Thus, as the horn 6 and the circular guide 5 are common to the waves of the primary and secondary radars, a fraction of the energy of the primary radar signals could be transmitted to the transceiver 15 of the secondary radar by the probes. These signals are eliminated in circuit 13.

The dimensions of guide 5 are determined for a correct operation of the source at the frequency of the primary radar. As the operating frequency of the secondary radar is generally below that of the primary radar, guide 5 cuts off the waves of the secondary radar. A dielectric plate 22 is placed within this guide. The shape of the plate has been so shown as not to modify the performance of the primary source at the frequency of the primary radar. Thus, the large faces of the plate are perpendicular to the polarization vector 7 of the radar waves, so that they traverse a minimum thickness. However, the plate thickness is at a maximum for the interrogation signals. On the horn side the contour of the plate is elliptical and on the side of guide 4 it is beveled. The plate is made from polypropylene, which has a low loss coefficient.

Thus, the signals of the primary radar and the interrogation signals are emitted by the same horn 6 that illuminates the reflector R which may have a double curvature. Such a reflector has a considerable directivity in azimuth and an elevation diagram which is close to a squared cosecant. The operating mode in interrogation consequently benefits from good characteristics of the common-reflector directivity and gain, making it possible to use a transceiver with a lower performance level for obtaining results equal to those of known systems.

The control signals are transmitted and received by two auxiliary sources 16 and 17 (referred to as ancillary feeders in the prior patent) which are positioned on either side of horn 6. These sources are connected to the secondary-radar transceiver 15 via a power-dividing circuit 20, coaxial bidirectional lines 18 and 19 extending between the sources and the divider, and a bidirectional line 21 lying between the divider and the transceiver 15. The components so far described all have counterparts in the prior patent.

Sources 16 and 17 are supplied in phase opposition in order for the radiation diagram of the control signal to be of the differential type, i.e. to have a zero gain in the axis of the major lobe of the interrogation diagram. Obviously the axes of these two sources are in the same horizontal plane. The reflector R of the radar antenna is illuminated by the control sources. Thus, the control-radiation diagram is of the differential type in azimuth and of the squared-cosecant type in elevation, owing to the properties of the reflector.

Each source 16 or 17 is, for example, constituted by a group of dipoles placed in a tightly sealed case as illustrated in the prior patent. The metal base of the case serves as the reflector plane. The cover of the case, which is permeable to waves, is, for example, made from polyester glass. The power divider 26 comprises, for example, one or more hybrid rings.

According to the invention the radiation diagram of the control channel, which is of the difference type in azimuth and which has an interrogation arc too wide to permit under all circumstances a discrimination among targets, mainly in the approach zone, is supplemented by another radiation diagram in azimuth which is also of the difference type and permits a separation of the targets in the approach zone, i.e. has a finer azimuthal resolution.

Thus, the secondary-radar antenna, which already has an interrogation channel and a control channel, is also provided with a monopulse channel, i.e. it has a further difference diagram in addition to the radiation diagram described hereinbefore. More specifically, in connection with the monopulse function, a sum channel and a difference channel are formed at the response frequency of the transponders aboard the interrogated aircraft which, in the present embodiment, is 1090 MHz. The incoming sum signal is obtained at the output of the hybrid circuit 13 where it is separated from the primary-radar signal. This sum signal is nothing more than the response signal of the transponders. To form the difference diagram with a high azimuthal resolution, my invention provides for a pair of additional auxiliary sources in the form of two dipoles 23, 24 located on either side of the radiating opening of the primary source 6 of the radar and in the same plane as sources 16 and 17 used for forming the control channel of the secondary radar associated with the primary radar. Dipoles 23, 24 therefore also confront the reflector R.

The sum and difference signals obtained in this new monopulse channel are processed in an angular-deviation-measurement receiver 27. For routing the different signals to the receiver 27, sources 23 and 24 are connected by cables 25, 30 to power divider 26 which is in turn connected by a line 28 to receiver 27. The latter is connected by a cable 29 to the transceiver 15 of the existing secondary radar which transmits to it the sum signal of the supplemental channel created according to the invention.

It should be noted, and this is clearly visible in the drawing, that sources 23, 24 contributing to the formation of the supplemental difference channel are placed closer to the radiating opening of the primary source 6 than sources 16 and 17 of the control channel of the secondary radar. This arrangement is dictated by the necessity of having a considerable angular-deviation slope, which is a function of the distance between the sources on either side of the focal axis of the aerial.

Figure 2:
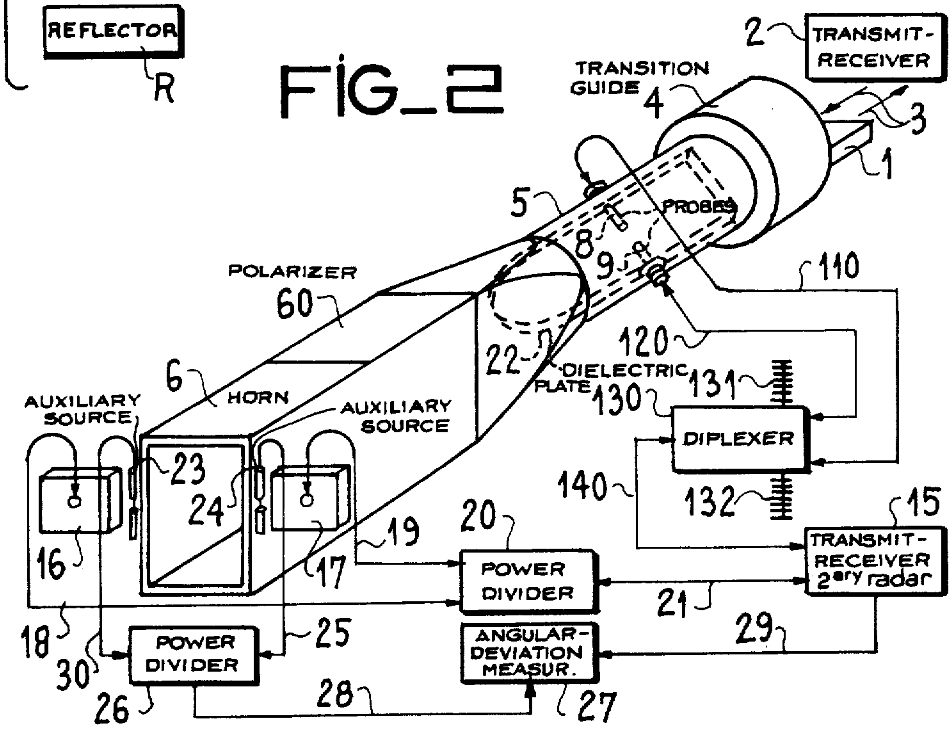
FIG. 2 similarly shows another embodiment of an antenna according to the invention operating with circular polarization.

FIG. 2 shows a variant of the primary-radar/secondary-radar aerial according to the invention in the case where the primary source functions with circular polarization.

The difference between FIG. 2 and FIG. 1, in which the primary source functions with horizontal polarization, are not very great and are similar to those between corresponding Figures of U.S. Pat. No. 3,916,414.

The actual primary source here again comprises a rectangular guide 3, a transition guide 4, a circular guide 5 and a horn 6 which in this instance contains a polarizer 60. The axis of probes 8 and 9 is inclined by 45° to the vertical. These probes, making it possible to recover the waves that are reflected on the front end of the horn on transmission and are then dissipated in absorbent loads connected thereto, are necessary for a satisfactory operation in this polarization mode. For operation in interrogation, probes 8 and 9 are used as in the case of FIG. 1. To obtain this double function, a diplexer circuit 130 incorporating filters and a power divider is positioned between the transceiver 15 and the probes. Coaxial lines 110, 120 and 140 provide an ultrahigh-frequency connection between the probes and the diplexer on the one hand and between the diplexer and the transceiver 15 on the other. The diplexer separates the primary-radar and interrogation signals. The signals from the primary radar are dissipated in resistive loads 131 and 132.

A dielectric plate 16 is again placed in circular guide 5. Its median plane contains the axis of the probes. The polarization plane of the primary-radar wave is perpendicular to the dielectric plate.

When operating in the interrogation mode, the circular guide 5 is excited symmetrically by the recovery probes 8 and 9. After passing into polarizer 60 and horn 6, the interrogation signals are emitted with an elliptical polarization.

The responders installed aboard an aircraft are designed so as to transmit and receive waves with vertical linear polarization. No difficulty is caused by the fact that the polarization of the wave emitted by the secondary radar is elliptical. In range calculations everything takes place as if there was an antenna whose gain was approximately 3 dB below its nominal gain. In view of the increase in gain provided by the use of the reflector of the primary-radar antenna, this loss is unimportant.

The operation in the control mode is obtained, as in the case of FIG. 1, from two sources 16 and 17 connected to the transceiver 15 by bidirectional lines 18 and 19, power divider 20 and bidirectional line 21.

Each of the auxiliary sources comprises, as in the system of FIG. 1, a group of dipoles located on a metal base serving as the reflector. The dipoles are of the half-wave type. The various parameters of the dipoles (dimensions, distances to the reflector plane, etc.) are so chosen as to obtain a good adaptation and a correct radiation diagram.

As in the embodiment of FIG. 1, the monopulse channel added to the interrogation and control channels of the secondary radar is constituted by the probes 8 and 9, which supply the sum signal, and two auxiliary sources in the form of dipoles 23 and 24 located on either side of the primary source 6. The aforedescribed angular-deviation-measurement receiver 27 is again connected to the transceiver 15 of the secondary radar and to the power divider 26 which, in turn, is connected by cables 25 and 30 to dipoles 23 and 24.

Figure 3:
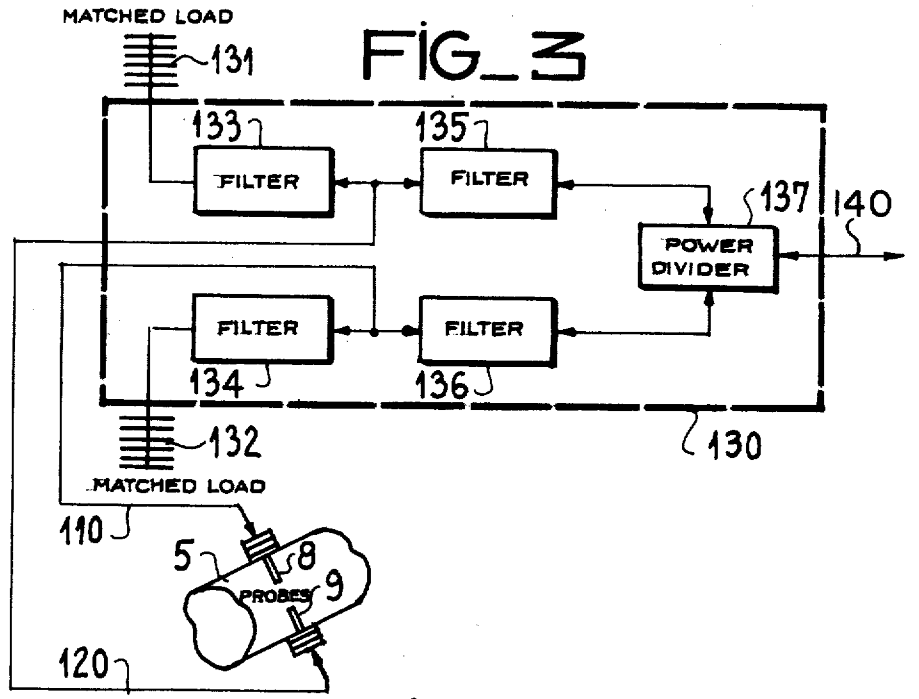
FIG. 3 is a block diagram of a diplexer included in the system of FIG. 2.

FIG. 3 is a diagram of the diplexer 130 used in the apparatus of FIG. 2. This diplexer makes it possible to connect the recovery probes 8 and 9 on the one hand to the matched loads 131, 132 for the signals of the primary radar and on the other hand to the transceiver 15 for the interrogation signals.

The diplexer 130, which is similar to one disclosed in U.S. Pat. No. 3,916,414, comprises two band-pass filters 133 and 134 centered on the operating frequency of the primary radar and two band-pass filters 135, 136 centered on the interrogation frequency; filters 133, 135 and 134, 136 have inputs respectively connected to the two probes 9 and 8 by means of bidirectional lines 120 and 110. The outputs of filters 133, 134 are connected to the matched loads 131, 132 which dissipate energy reflected on the opening of horn 6. The outputs of the other filters 135, 136 are connected to two terminals of a power divider 137, whose third terminal is connected to the transceiver 15 via a bidirectional line 140.

The arrangement of the probes 8 and 9, which are diametrically opposed in circular guide 5, makes it necessary to have a 180° phase displacement between the two channels supplying them. This phase displacement is obtained by the divider 137 which is constituted by a conventional hybrid ring. Diplexer 130 can be produced in the form of a photo-engraved, three-board circuit and is then sealed by coating in a molding operation.

Figure 4:
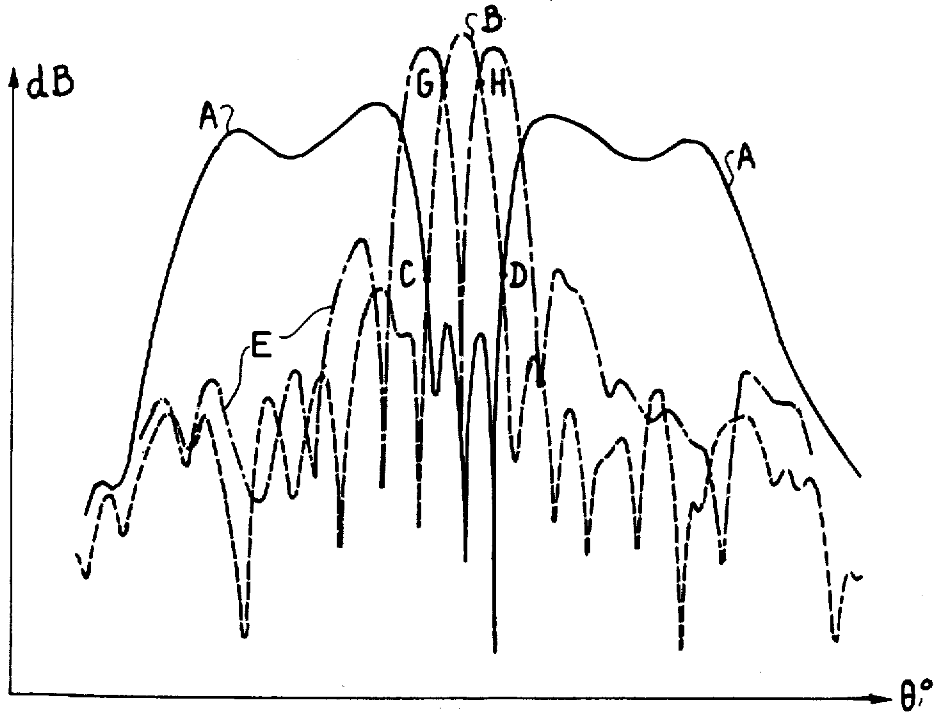
FIG. 4 is a graph giving the shape of the radiation diagrams for the different channels of the associated secondary radar.

FIG. 4 shows the radiation diagrams in azimuth of the interrogation channel, the control channel and the monopulse channel added to the two aforementioned channels for the aerial according to the invention.

The difference diagram of the control channel is shown by a curve A drawn in a continuous line. The sum diagram of the interrogation channel, which is also that of the added monopulse channel, is a broken-line curve B. The intersections of diagrams A and B define the interrogation arc indicated at CD. A curve E in dot-dash lines represents the difference diagram of the monopulse channel associated with the secondary radar, whose intersections with the sum diagram B define the angular-deviation-measurement arc GH.

These curves, plotted in dB against azimuth angle $\theta$, show certain advantages of the invention: the high level of intersection between the sum diagram B and the monopulse difference diagram E provides a convenient slope for the angular-deviation measurement corresponding to the power of discrimination between the targets, the width of arc GH being substantially less than that of the interrogation arc CD defined by the intersections of the lobes of the interrogation channel B and the control channel A.

Thus, my invention obviates the drawback due to the lack of adequate resolution of the interrogation arc. In particular, the simplicity of the present improvement consisting in adding a monopulse channel to a primary-radar/secondary-radar integrated aerial, while using some of the existing components including the probes 8, 9, has led to an optimization of the monopulse and control difference channels.

I claim:

1. In a radar system for the monitoring of air traffic, including a primary-radar transceiver, a secondary-radar transceiver, a reflector, a primary feeder confronting said reflector and comprising in succession a rectangular waveguide connected to the primary-radar transceiver for carrying high-frequency wave energy therebetween, a matching waveguide, a circular waveguide with a cylindrical section, and a rectangular horn extending from said circular waveguide toward said reflector, two probes arranged at diametrically opposite locations in said cylindrical section, said probes having a common axis which includes an angle of not more than about 45° with the planes of the major sides of the rectangular horn, said probes being connected to the secondary-radar transceiver for exchanging interrogation signals therewith, two ancillary feeders facing said reflector in symmetrical positions on opposite sides of the rectangular horn, and a power divider inserted between the secondary-radar transceiver and said ancillary feeders for supplying same with phase-opposed control signals to be radiated toward said reflector for transmission to an aircraft along with said interrogation signals, the combination therewith of a monopulse channel carrying incoming signals from transponders aboard the interrogated aircraft, said monopulse channel including a pair of auxiliary sources flanking said horn and confronting said reflector in a common azimuthal plane with said ancillary feeders, and angular-deviation-measuring means with inputs connected to said auxiliary sources and to said probes for respectively receiving therefrom a difference signal and a sum signal of said monopulse channel.

2. The combination defined in claim 1 wherein said auxiliary sources are disposed between said rectangular horn and said ancillary feeders.

3. The combination defined in claim 2 wherein said auxiliary sources are dipoles paralleling and closely adjoining said major sides.

4. The combination defined in claim 1, 2 or 3 wherein said angular-deviation-measuring means is connected to said auxiliary sources by way of a further power divider.

5. The combination defined in claim 1, 2 or 3 wherein said angular-deviation-measuring means is connected to said probes by way of said secondary-radar transceiver.

* * * * *